United States Patent
Sato

[11] 4,041,481
[45] Aug. 9, 1977

[54] SCANNING APPARATUS FOR AN ELECTROPHORETIC MATRIX DISPLAY PANEL

[75] Inventor: Teruo Sato, Kyoto, Japan

[73] Assignee: Matsushita Electric Industrial Co., Ltd., Japan

[21] Appl. No.: 618,681

[22] Filed: Oct. 1, 1975

[30] Foreign Application Priority Data
Oct. 5, 1974   Japan .............................. 49-114903
Oct. 5, 1974   Japan .............................. 49-114905

[51] Int. Cl.² .......................... G06K 15/18; G02F 1/13
[52] U.S. Cl. .......................... 340/324 M; 340/166 EL; 350/160 R
[58] Field of Search ...... 204/180 R, 181 PE, 299 PE, 204/300 PE; 340/324 M, 336; 350/160 R

[56] References Cited

U.S. PATENT DOCUMENTS

| | | | |
|---|---|---|---|
| 3,756,693 | 9/1973 | Ota .................................... | 350/160 R |
| 3,823,998 | 7/1974 | Yazaki et al. ..................... | 350/160 R |
| 3,835,463 | 9/1974 | Tsukamoto et al. ............ | 340/324 M |
| 3,891,306 | 6/1975 | Mitomo et al. ................. | 340/324 M |
| 3,892,568 | 7/1975 | Ota .................................. | 204/181 PE |

*Primary Examiner*—David L. Trafton
*Attorney, Agent, or Firm*—Wenderoth, Lind & Ponack

[57] ABSTRACT

A scanning apparatus for an electrophoretic matrix display panel, has a horizontal (X-line) electrode driving circuit to provide a selecting pulse, a vertical (Y-line) electrode driving circuit to provide a data pulse, and an information signal supply means. An electric field is imposed across cells of an electrophoretic suspension layer to change the optical reflective property of the cells in a predetermined sequence after a pause interval by the horizontal and vertical electrode driving circuits. This causes operation of the display panel without cross effect.

3 Claims, 22 Drawing Figures

SCANNING APPARATUS FOR AN ELECTROPHORETIC MATRIX DISPLAY PANEL

This invention relates to a scanning apparatus for an electrophoretic matrix display panel to produce a line drawing such as characters or bar graphs from an image information signal.

A cathode ray tube is now widely used as an electric display apparatus because of its high operation speed, ease of scanning, and so on, but it still has some disadvantages. For example, a cathode ray tube is difficult to manufacture in the form of a flat panel or in a large size. In addition, it requires a high voltage to operate.

There have been proposed many types of electric panel display apparatus such as an electroluminescent panel, arrays of luminescent diodes, incandescent lamps and plasma cells. They are all self-luminescent types, but are not in widespread use because of their inferiority in, for example, luminescent efficiency, life and cost. Further, it is difficult for them to memorize or record the displayed image. Liquid crystals are one possible media to constitute a flat panel display apparatus capable of changing color by a change in an electric field or change in heat. At present, their properties are not entirely satisfactory for matrix display purposes.

An electrophoretic display device disclosed in U.S. Pat. No. 3,668,106 is a typical display device for a large size and flat panel display. The electrophoretic matrix display panel of U.S. Pat. No. 3,668,106 consists essentially of an electrophoretic suspension layer sandwiched between two sets of spaced parallel electrodes. One set of parallel electrodes (X-line electrodes) are positioned on one side of the electrophoretic suspension layer, and the other set of parallel electrodes (Y-line electrodes) are positioned on the other side of the electrophoretic suspension layer. The X-line electrodes extend in a direction perpendicular to the direction in which the Y-line electrodes extend. The electrophoretic in which the Y-line electrodes extend. The electrophoretic suspension layer comprises a liquid having charged (electrophoretic) particles dispersed therein. Each portion of the suspension layer sandwiched between each X-line electrode and each Y-line electrode acts as a display cell. When a D.C. electric field is applied across one of the X-line electrodes and one of the Y-line electrodes, the optical reflective property of the portion of the suspension layer located at the intersection of the two electrodes, i.e. a display cell, is changed because the charged particles electrophoretically are attracted to and move toward one of the two electrodes so that the charged particles which are colored hide the liquid or the liquid which is colored hides the charged particles.

It is thus possible to produce an image on the matrix display panel by applying voltages to selected X-line and Y-line electrodes, and if the voltages are applied scanningly, desired images can be easily formed on the matrix display panel. In such an electrophoretic image display device, it is desirable to use line-by-line scanning using line memory means instead of sequential element-by-element scanning because of the slow response of the electrophoretic display panel.

However, an undesired change in the optical reflective property is generated in the cells on the unselected electrodes, often near the selected (operated) cells, said undesired change being the result of the data pulses applied on the Y-line electrodes. This phenomenon, called the "cross effect", reduces the contrast between the image and the background. It is an important problem in designing a matrix display system to eliminate or reduce the cross effect.

Various display systems and devices for eliminating or reducing the cross effect in matrix panels in other fields, such as an electroluminescent panel, have been proposed. For example, it is a well known technique to provide in an arrangement of an electroluminescent display panel, an electroluminescent layer and a non-linear impedance layer, comprising silicon carbide, cadmium sulfide or cadmium selenide, embedded in a binder layer, sandwiched in series between the X-line and Y-line electrodes in order to practically eliminate or reduce the cross effect. Such panels may also be effective for accomplishing a satisfactory display. However, for electrophoretic suspension layer, it is difficult to match the impedance of the electrophoretic suspension layer with the impedance of a non-linear impedance layer, because of the very high (insulator-like) impedance of the electrophoretic suspension layer. Moreover, in order to reproduce an image on the electrophoretic display panel by matrix-addressing, it is required that the panel hold or memorize, during the unselected period, the image displayed in the selected period, because the electrophoretic display cell is not self-luminous but rather the light reflection from the display cell is modulated by an external voltage source.

The contrast ratio between a light cell and a dark cell of an electrophoretic matrix display panel is 100:1 at best. In the case where the electrophoretic display panel consisting of a large number of display cells has no holding or memory function and the display cells are driven by a matrix addressing mode of one-hundredth duty factor, the average contrast ratio between the light (operated or selected) cell and the dark (non-operated or unselected) cell is lowered by that duty factor. Therefore, a picture of good contrast cannot in principle be displayed on a matrix electrophoretic display panel.

It is an object of this invention to provide an improved scanning apparatus for an electrophoretic matrix display panel by which an image is satisfactorily reproduced and held.

It is another object of this invention to provide an improved apparatus for an electrophoretic matrix display panel by which the cross effect can be greatly suppressed.

These objects are achieved according to this invention by a scanning apparatus comprising an X-line electrode driving circuit adapted to be coupled to X-line electrodes and having a set of X-line drivers for supplying an X-erasing pulse and a selecting pulse to a selected X-line electrode, a pause interval being provided before the selecting pulse is supplied and after the X-erasing pulse is supplied so as to stop the supply of voltage to the selected X-line electrode during the pause interval; a Y-line electrode driving circuit adapted to be coupled to the Y-line electrodes and having a set of Y-line drivers for supplying a Y-erasing pulse and a data pulse to a selected Y-line electrode, the Y-erasing pulse and a pause interval and the data pulse supplied to the Y-line electrode being synchronized with the X-erasing pulse, pause interval and selecting pulse supplied to the X-line electrode, respectively, so as to stop the supply of a voltage to the display cell at the intersection of the X-line electrode and the Y-line electrode during the pause interval, the voltage difference between the selecting pulse and the data pulse (i.e. the sum voltage of the selecting pulse and the data pulse) being supplied, as an information pulse, to the display cell; and an information signal supply means coupled to the X-line and Y-line electrode driving circuits for supplying thereto an information signal.

Other objects and advantages of this invention will be apparent from the following description, the appended claims and the accompanying drawings, in which:

Figure 1:
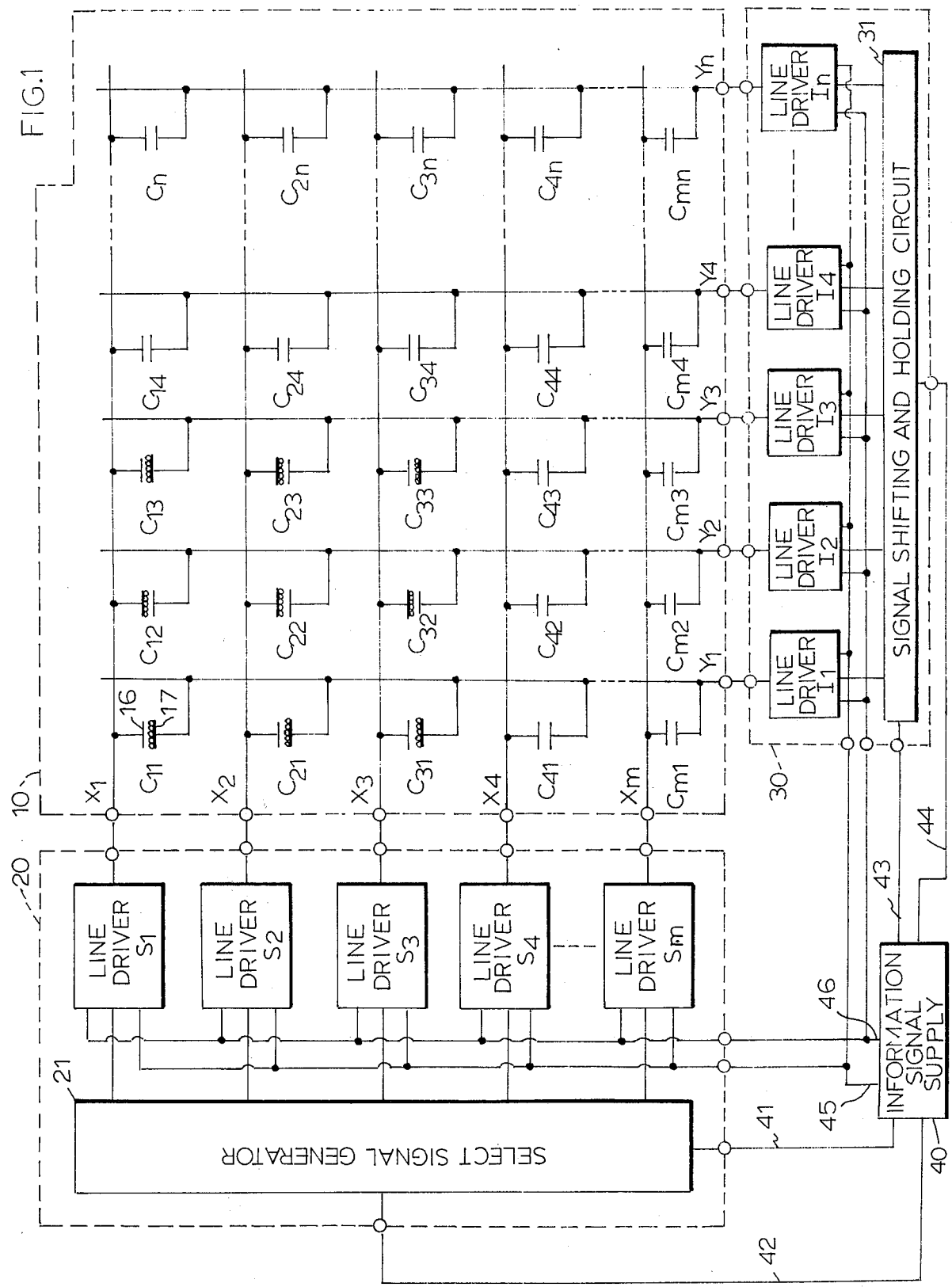
FIG. 1 is a block diagram of an electrophoretic matrix display including a display panel and a scanning apparatus according to this invention.

The size and shapes of the elements of the drawing should not be considered as actual size or even proportional to actual sizes because many elements have been purposely distorted in size or shape in order to more fully and clearly describe the invention.

Referring to FIG. 1, reference numeral 10 designates an electrophoretic matrix display panel driven by an X-line driving circuit 20 and a Y-line driving circuit 30. Reference numeral 40 designates an information signal supply means for supplying information signals to the X-line and Y-line driving circuits.

Figure 2:
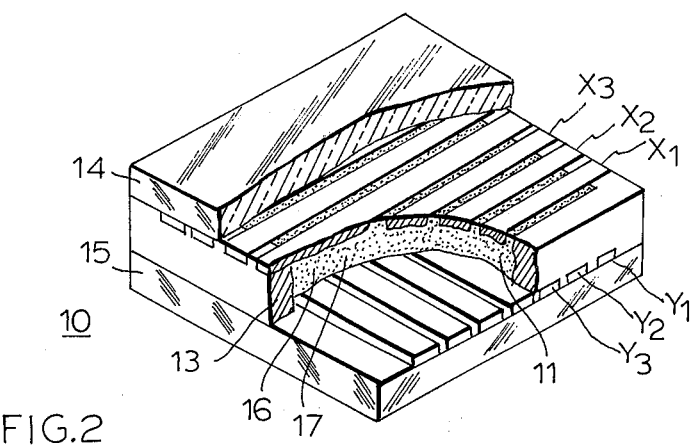
FIG. 2 is a perspective view, partly broken away, of a typical electrophoretic matrix display panel.

FIG. 2 shows a typical electrophoretic matrix display panel 10, which comprises an electrophoretic suspension layer 11, X-line electrodes $X_1$, $X_2$, $X_3$, Y-line electrodes $Y_1$, $Y_2$, $Y_3$, (the X- and/or Y-line electrodes being transparent) and two opposed major housing walls 14 and 15. The electrophoretic suspension layer 11 includes a dispersion of an electrophoretic material in the form of charged particles 16 in a finely divided powder form suspended in a suspending medium 17 and is enclosed in a housing having a frame in the form of a 13 and the two spaced opposed major housing walls 14 and 15, at least one of which is transparent. In FIG. 2, the housing wall 14 is transparent, and therefore in this particular embodiment the X-line electrodes are transparent. The X-line electrodes $X_1$, $X_2$, $X_3$, and the Y-line electrodes $Y_1$, $Y_2$, $Y_3$, are attached to the inner surface of the transparent housing wall 14 and the housing wall 15, respectively. Accordingly, the electrophoretic matrix display panel 10 has a multiplicity of display cells which constitute picture elements $C_{11}$, $C_{12}$, $C_{13}$, $C_{21}$, $C_{22}$, $C_{23}$, $C_{31}$, $C_{32}$, $C_{33}$, (these reference characters being in FIG. 1) which are located at the intersections of the X-line and Y-line electrodes.

Referring to FIG. 1 again, the X-line driving circuit 20 comprises a set of X-line drivers $S_1$, $S_2$, $S_2$, $S_i$, connected to the associated X-line electrodes $X_1$, $X_2$, $X_3$, and an X-line select signal generator 21 which comprises well-known components such as a shift register for generating X-line select signals for driving respective X-line drivers $S_1$, $S_2$, $S_3$,. The X-line drivers are provided to supply X-erasing pulses and selecting pulses with pause intervals to the X-line electrodes. The Y-line driving circuit 30 comprises a set of Y-line drivers $I_1$, $I_2$, $I_3$, $I_j$, connected to the associated Y-line electrodes $Y_1$, $Y_2$, $Y_3$, and an information signal shifting and holding circuit 31 which comprises well-known components having stages of same number as the number of Y-line electrodes, such as a shift register, for supplying Y-line data signals for driving respective Y-line drivers $I_1$, $I_2$, $I_3$,. The Y-line drivers are provided to supply Y-erasing pulses and data pulses with pause intervals to Y-line electrodes. The Y-erasing pulse, pause interval and data pulse supplied to the Y-line electrode for one display cell are synchronized with the X-erasing pulse, pause interval and selecting pulse supplied to the X-line electrode for the same display cell, respectively. The information signal supply means 40 which comprises well-known components supplies the X-line select signal generator 21 with display start signal 41 and X-line-shift signal 42, and also supplies the information signal shifting and holding circuit 31 with Y-line information signals 43 and information shift signals 44. The information signal supply means 40 also supplies all of the X-line drivers $S_1$, $S_2$, $S_3$, and Y-line drivers $I_1$, $I_2$, $I_3$, with an erase signal 45 and a pause signal 46.

It has been discovered according to this invention that the cross effect in an electrophoretic image display is greatly suppressed by supplying the selecting pulses and data pulses after a pause interval during which cells are not supplied with any voltage.

Figure 3:
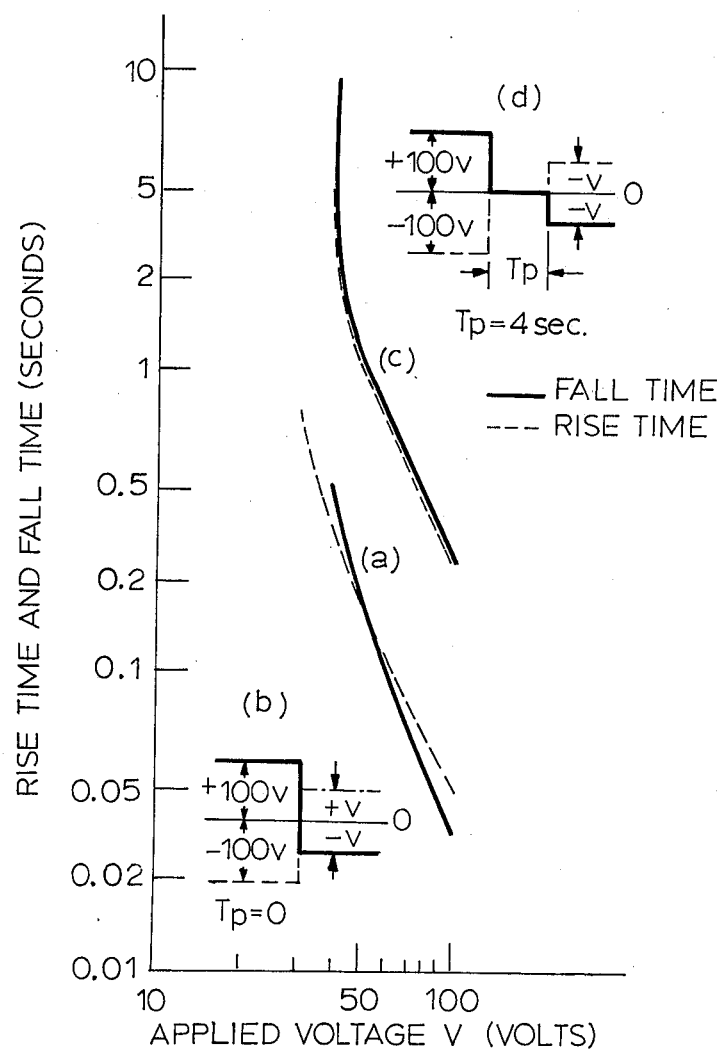
FIG. 3 is a graph of experimental data showing the relationship between the response times and the applied voltage of a typical electrophoretic display cell.

FIG. 3 illustrates the relation of an applied voltage to response time for an electrophoetic display cell (which is referred to as a POBNL cell hereinafter) using an electrophoretic suspension layer including a dispersion of titanium dioxide pigments encapsulated with phenol resin suspended in low viscosity liquid which is a fluorinated hydrocarbon as a main suspending medium. In the POBNL cell, the main suspending medium is dyed blue by Macrolex Blue FR (manufactured by Farbenfabriken Bayer A.G., Leverkusen, Germany) and the powder of the titanium dioxide pigments encapsulated with phenol resin is white and has a negative charge in the main suspending medium.

Curve (a) of FIG. 3 shows the rise time and fall time versus applied voltage V of the POBNL cell, when the applied voltage is reversed instantaneously from $\pm$ 100 volts to $\mp$ V volts, as shown in wave form (b). On the other hand, curve (c) shows the case when the applied voltage is reversed from $\pm$ 100 volts through a 4 sec pause interval to $\mp$ V volts, as shown in wave form (d), during which both electrodes of the POBNL cell are shunted.

It will be understood from FIG. 3 that in the case where applied voltage is supplied to the POBNL cell after the pause interval, the rise and fall times of the cell are lengthened within the full range of applied voltage, and especially both response times are extremely lengthened in the range of low applied voltage. In particular, the POBNL cell never responds to an applied voltage below 35 volts. This means that the cell has a threshold voltage of 35 volts, below which the cell does not respond. This threshold voltage is dependent on the length of the pause interval and the applied voltage value before the pause interval. Such characteristics of response time are effective for eliminating the cross effect in the scanning of the electrophoretic matrix display device.

It will also be understood that the rise and fall times of the POBNL cell are nearly equal, as shown by wave form (c). Accordingly, in the case where the addressing of the POBNL matrix panel is carried out in the mode of erasure and writing with respect to every X-line, the updating the time for updating display is twice as long as the time necessary for only writing. It is therefore preferable that all of the cells in the matrix panel be erased simultaneously at the start of updating of the display, and writing only is carried out with respect to every X-line.

The operation of an example of the apparatus of this invention will be described hereinafter in conjunction with FIGS. 1, 4 and 5 for the case where information signals are provided to display a pattern in which at the cells $C_{11}$, $C_{21}$ and $C_{31}$ connected to the $Y_1$ electrode, the $Y_1$ electrode side becomes white, at the cells $C_{12}$, $C_{22}$ and $C_{32}$ connected to the $Y_2$ electrode, the $Y_2$ electrode side becomes blue, and at the cells $C_{13}$ and $C_{33}$ connected to the $Y_3$ electrode, the $Y_3$ electrode side becomes white, and at the cells $C_{23}$ the $Y_3$ electrode side becomes blue, as schematically shown in FIG. 1.

Figure 4:
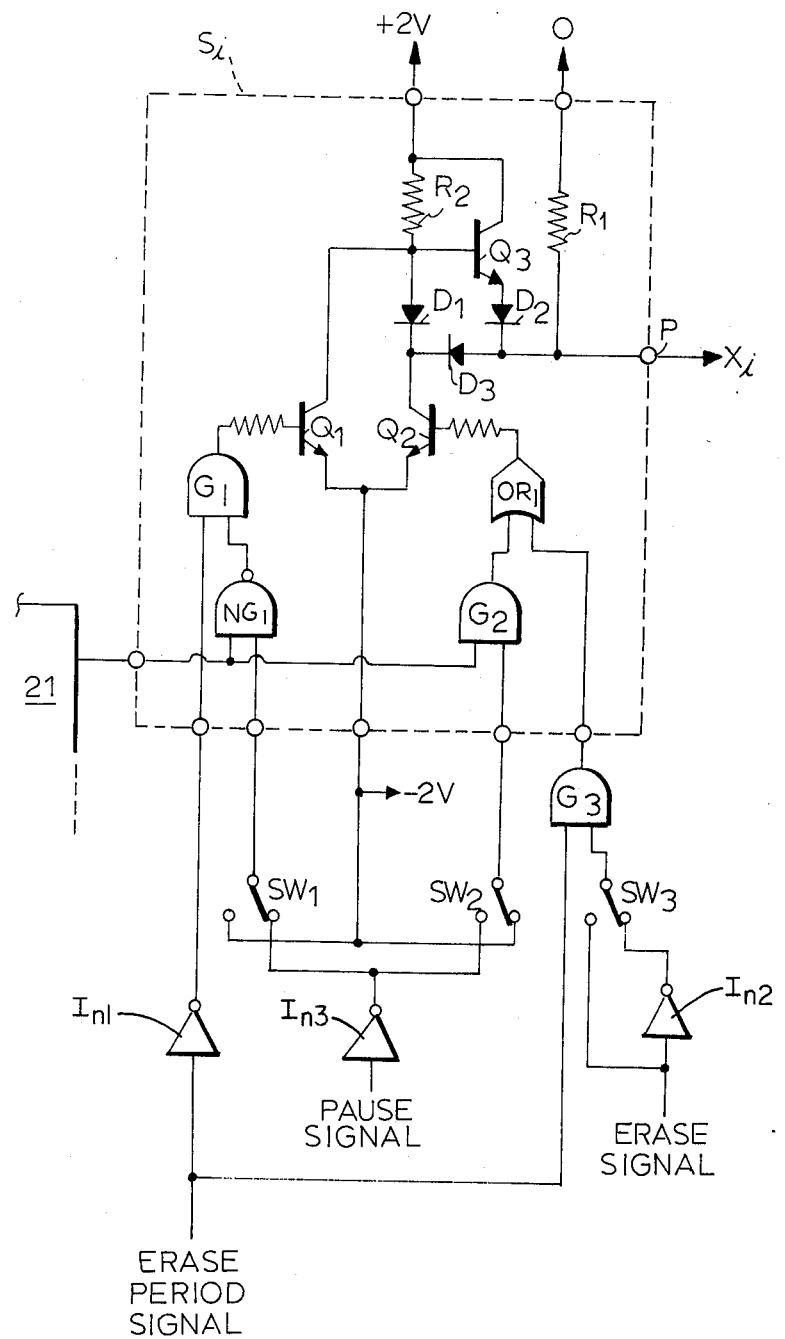
FIG. 4 is a simplified circuit diagram of an example of an X-line driver $S_i$.
Figure 5:
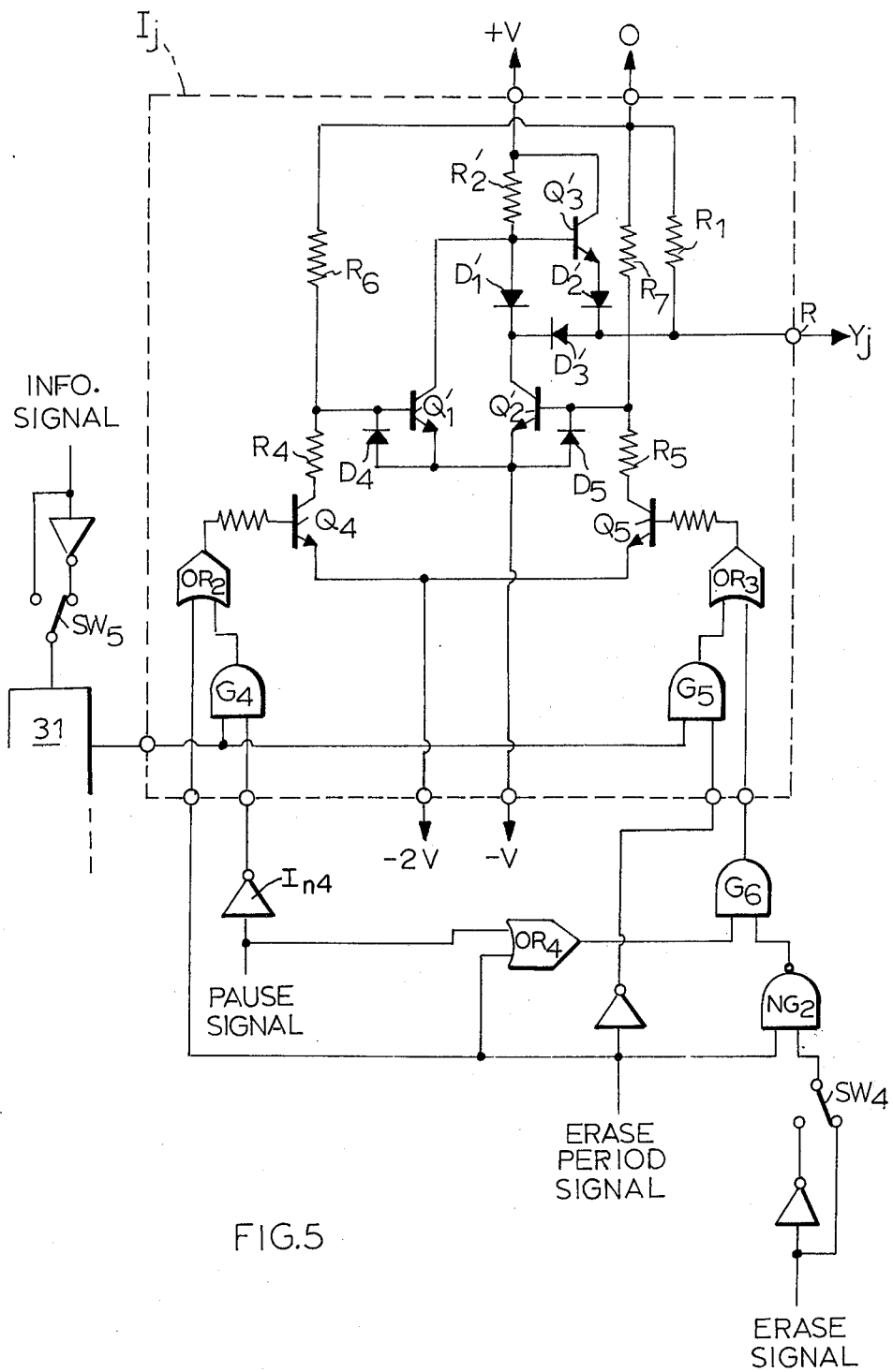
FIG. 5 is a simplified circuit diagram of an example of a Y-line driver $I_j$.

FIGS. 4 and 5 are simplified circuit diagrams of an example of an X-line driver $S_i$ and an example of a Y-line driver $I_j$, respectively, for explaining their operations. FIGS. 6A-6E are waveforms showing the relationship, in time, among the erase period signal, the erase signal, the pause signal, the select signal and the date signal. The switches $SW_1$, $SW_2$, $SW_3$, $SW_4$ and $SW_5$ are used for inverting the color of the information and the background, and in the case where all of the switches $SW_1$ to $SW_5$ are switched to the right pole, as shown in FIGS. 4 and 5, a white information display is presented on a blue background. When all of the switches $SW_1$ to $SW_5$ are switched to the left pole, a blue information display is presented on a white background.

Figure 6:
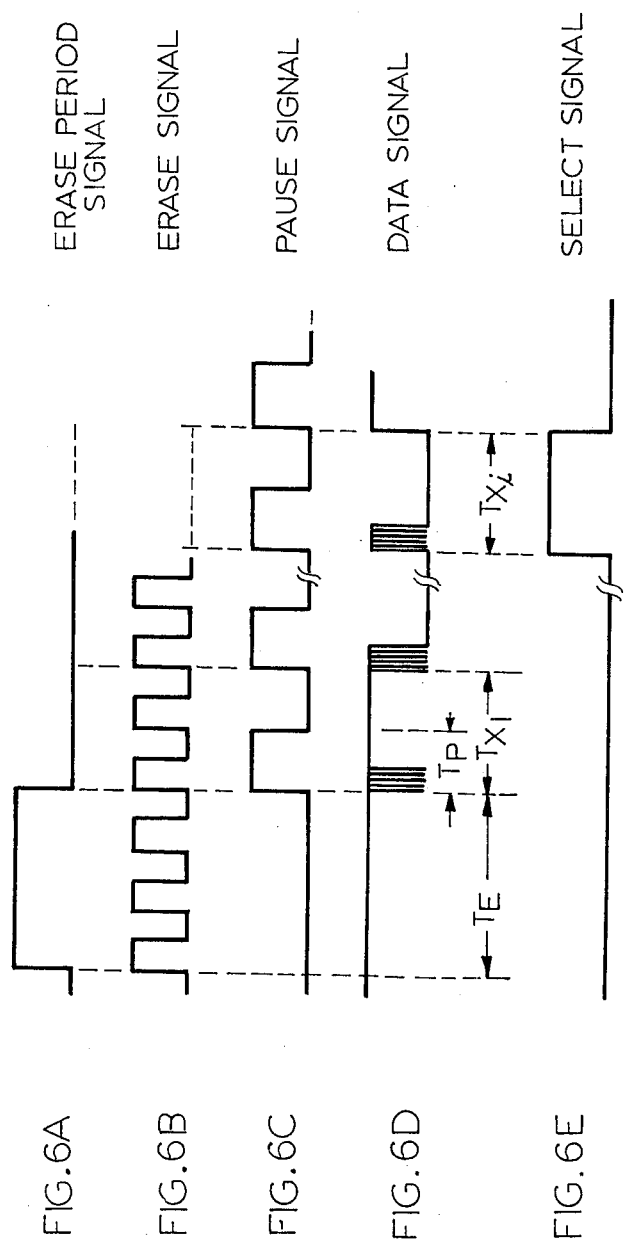
FIGS. 6A–6E are wave forms of the various signals showing the relationship, in time, among the erase period signal, the erase signal, the pause signal and the information signal.

At the start of the display, an erase period signal, as shown in FIG. 6A, which is generated in the information signal supply means 40 is inverted in inverter in, closes AND gate $G_1$, and therefore, transistor $Q_1$ is cut off during the duration of the erase period signal. At the same time, the erase period signal opens AND gate $G_3$, the therefore, the inverted erase signal, as shown in FIG. 6B, which has been inverted in inverter in 2 is applied through the AND gate $G_3$ and OR gate $OR_1$ to transistor $Q_2$ during the duration of the erase period signal. Accordingly, the transistor $Q_2$ turns on and off according to the inverted erase signal. When the transistor $Q_2$ is on, the transistor $Q_3$ is off because the base voltage of the transistor $Q_3$ becomes low due to the collector current of the transistor $Q_2$, and the voltage at the output terminal P of the X-line driver $S_i$ is about $-2V$ volts. When the transistor $Q_2$ is off, the transistor $Q_3$ is on because the voltage of $+2V$ volts is applied to the base electrode of the transistor $Q_3$ through resistor $R_2$, and the voltage at the output terminal P is about $+2V$ volts. In this way, the X-line driver $S_i$ generates the alternating X-erase pulse $V_{EX}$ having a $\pm 2V$ pulse amplitude.

On the other hand, at the Y-line driver $I_j$, as shown in FIG. 5, the erase period signal is applied to transistor $Q_4$ through OR gate $OR_2$, and the transistor $Q_4$ is turned on. The collector current through diode $D_4$ and resistor $R_4$ causes transistor $Q_1'$ to become off because the base of the transistor $Q_1'$ becomes negative due to the forward current voltage drop of the diode $D_4$. The erase period signal opens AND gate $NG_2$ and AND gate $G_6$, and accordingly, the erase signal, as shown in FIG. 6B, is applied to transistor $Q_5$ through the OR gate $OR_3$. Therefore, transistor $Q_2'$ turns on and off, as the transistor $Q_5$ turns off and on according to the erase signal during the duration of the erase period signal. The Y-line driver $I_j$ generates alternating Y-erase pulse $V_{EY}$ having $\pm V$ pulse amplitude at the output terminal R of the Y-line driver $I_j$ in the same manner as in the case of the X-line driver $S_i$.

After the end of the erase period $T_E$, the scanning of the electrophoretic matrix panel is started. In the X-line driver $S_i$, as the AND gate $G_2$ and the AND gate $G_3$ are closed, the transistor $Q_2$ is always off. When the select signal, as shown in FIG. 6E, from the select signal generator 21 opens the NAND gate $NG_1$, the pause signal is applied through inverter in 3 to the transistor $Q_1$, as the gate $G_1$ is always open in this scanning period. Therefore, the transitor $Q_1$ is on and the transistor $Q_3$ is off. In this way, since both the transistors $Q_2$ and $Q_3$ are off, the voltage at the output terminal P of the X-line driver $S_i$ becomes about 0 volts to which the terminal P is connected through the resistor $R_1$.

After the end of the pause signal, the select signal from the select signal generator 21 is inverted by the NAND gate $NG_1$ and is applied to the transistor $Q_1$. In this case, the transistor $Q_1$ is off and the transistor $Q_3$ is on, and therefore, the X-line driver $S_i$ generates the selecting pulse having $+2V$ pulse amplitude. In the Y-line scanning, just after the start of the pause signal, the Y-line information signal 43 corresponding to the $X_i$-line from the information signal supply means 40 is applied to the input terminal of the shifting and holding circuit 31 and is shifted from left to right sequentially along the length of the shifting and holding circuit 31 by the information shift signal 44 from the information supply means 40.

When the information signals 43 have been distributed over the length of the shifting and holding circuit 31, the information signal supply means 40 stops applying the information shift signal 44, and therefore, the information signals are held in each stage of shifting and holding circuit 31, and are supplied to each of the Y-line drivers $I_1$, $I_2$, $I_3$,. FIG. 6D shows one of the waveforms of the data signal which is provided to one of the Y-line drivers.

During the pause interval, a pause signal as shown in FIG. 6C is always applied to the transistor $Q_5$ through the OR gate $OR_4$, AND gate $G_6$ and OR gate $OR_3$, and the pause signal inverted in inverter In 4 closes and AND gate $G_4$, lest the information signal from the shifting and holding circuit 31 be applied to both transistors $Q_4$ and $Q_5$. The transistor $Q_4$ is off, because it is supplied with the inverted pause signal. Therefore, the transistor $Q_1'$ is on and the transistor $Q_3'$ is off. As the transistor $Q_5$ is on, the transistor $Q_2'$ is off. As a result, the output voltage at the terminal R of the Y-line driver $I_j$ is about 0 volts, in the same manner as in the case of the X-line driver $S_i$. When the pause signal has disappeared, the inverted information signal, which is a "0" digit, applied to the transistor $Q_5$ through the AND gate $G_5$ and OR gate $OR_3$ causes the transistor $Q_5$ to be off. And therefore, the transistor $Q_2'$ is on, and the output voltage of the Y-line driver $I_j$ is $-$ V volts. In the case where a "1" digit information signal is applied to the Y-line driver $I_j$, the transistor $Q_4$ is on and the output voltage of the Y-line driver $I_j$ is $+$V volts.

FIGS. 7A-7I are waveforms showing the relationship, in time, among the applied pulses on the $X_1$, $X_2$, $X_3$, $Y_1$, $Y_2$ and $Y_3$ electrodes and of the applied voltage on the cells $C_{11}$, $C_{12}$ and $C_{23}$. FIGS. 7A, 7B and 7C show the waveforms of the voltages applied to the $X_1$, $X_2$ and $X_3$ electrodes, respectively. Also, FIG. 7D, 7E and 7F show the waveforms of the voltages applied to the $Y_1$, $Y_2$ and $Y_3$ electrodes, respectively. In the erase period, all of the X-line drivers $S_1$, $S_2$, $S_3$, and Y-line drivers $I_1$, $I_2$, $I_3$, are supplied with erase signal 45 from the information signal supply means 40, and apply simultaneously the alternating X-erase pulses $V_{EX}$ and Y-erase pulses $V_{EY}$ to the associated electrodes, respectively. Then, all of the X-line and Y-line drivers $S_1$, $S_2$, $S_3$, $I_1$, $I_2$, $I_3$, are applied with a pause signal 46 from the information signal supply means 40 and apply the same voltage to all of the X-line and Y-line electrodes during the pause interval $T_p$, as described above.

When the pause signal supplied to all of the X-line and Y-line drivers is stopped, the $X_1$-line driver $S_1$ generates a selecting pulse $V_S$ having $+$ 2V pulse amplitude, and at the same time each of the Y-line drivers $I_1$, $I_2$, $I_3$, generates a data pulse $V_1$ having $+$ V or $-$ V pulse amplitude, respectively, as shown in FIGS. 7A, 7D, 7E and 7F. Consequently, the cells $C_{11}$, $C_{12}$, $C_{13}$, along the selected $X_1$ electrode are supplied with a D.C. electric field in response to the information signals, and display the information on their surfaces. Such action is repeated for each X-line period of the information signal sequentially, and scanning of the whole display panel is thus carried out.

The applied voltage on cell $C_{11}$ is a potential difference between the $X_1$ electrode voltage and $Y_1$ electrode voltage, that in FIGS. 7A and 7D, as shown in FIG. 7G. Similarly, the applied voltages on cells $C_{12}$ and $C_{23}$ are obtained from FIG. 7A and 7E, and from FIGS. 7B and 7F, as shown in FIGS. 7H and 7I, respectively. The cell $C_{11}$ is supplied with a $-$ 3V amplitude pulse in the erase period $T_E$, and with a $+$ V or $-$ V amplitude pulse after the pause interval $T_p$ in each X-line period, as shown in FIG. 7G. The cell $C_{12}$ is supplied with a $-$ 3V amplitude pulse in the erase period, with a $+$ V amplitude pulse in the $X_1$-line period, and with a $+$ V amplitude pulse in the other X-line periods after the pause interval $T_p$ in each X-line period, as shown in FIG. 7H. The cell $C_{23}$ is supplied with a $-$ 3V amplitude pulse in the erase period, with a 3V amplitude pulse in the $X_2$-line period, and with a $-$ V amplitude pulse in the other X-line period after the pause interval $T_p$ in each X-line period, as shown in FIG. 7I.

It will be understood from FIGS. 7H and 7I that if the selected cell is supplied with a 3V amplitude pulse in order to produce an electrophoretic migration, the unselected cell may be supplied with $\pm$V amplitude pulse as a result of the cross effect. It is difficult to lower this undesired voltage due to the cross effect, although the lower the better.

Figure 8:
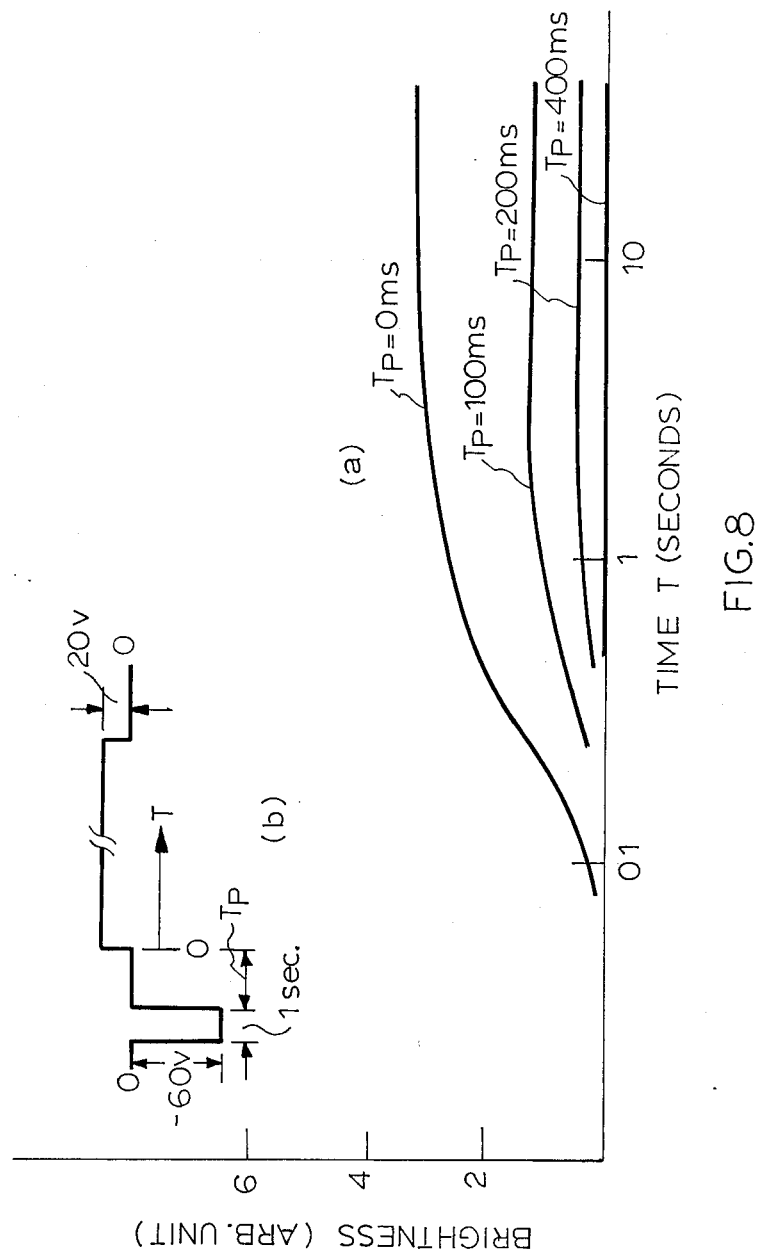
FIG. 8 is a graph of experimental data which shows rise characteristics of the response of a typical electrophoretic display cell with various pause intervals.

FIG. 8 shows the rise characteristics of the response of the POBNL cell to the information pulse of $+$ 20 volts pulse amplitude, in the case where the POBNL cell is supplied with the pulse which comprises a pulse having pulse amplitude of $-$ 60 volts and a pulse width of 1 sec., an information pulse having pulse amplitude of 30 20 volts and a pulse width of 40 sec., and a pause interval $T_p$ provided before the application of the information pulse, as shown in waveform (a). It will be understood from FIG. 8 that the longer the pause interval $T_p$, the less the electrophoretic migration (i.e. migration of the charged particles), and that the electrophoretic migration is never observed when the pause interval $T_p$ is longer than 0.4 sec. The fall characteristics of the response of the POBNL cell after the same method show less change in brightness than the rise characteristics, because some electrophoretic migration of the electrophoretic powder material deposited on the electrode, which is the side for displayed images to be viewed, causes the brightness to fall only a little.

According to the above described method, it is possible for the POBNL matrix panel to be scanned without any cross effect, by adjusting the pulse amplitude and width of the selecting pulse $V_s$ and the information pulse $V_I$ and the length of the pause interval $T_p$, so that electrophoretic migration will be completed by the application of $\pm$ 3V volts to the cell, and will not occur from the application of $\pm$ V volts. For example, supposing that X-erase pulse $V_{EX}$ has a $\pm$ 40 volts pulse amplitude and a 1 second width, Y-erase pulse $V_{EY}$ has a $\mp$ 20 volts pulse amplitude and a 1 second width, selecting pulse $V_S$ has a $+$ 40 volts pulse amplitude and a 1 second width, information pulse $V_I$ has a $+$ 20 or $-$20 volts amplitude and a 1 second width, and the length of the pause interval is 0.4 second. At the cell $C_{11}$, the electrophoretic migration towards the $Y_1$ electrode only occurs in the erase period, and therefore, the cell $C_{11}$ appears blue at the electrode to be viewed on the transparent X-electrode side. At the cell $C_{12}$, twice the electrophoretic migration towards $Y_2$ electrode in the erase period and towards $X_1$ electrode in the $X_1$-line period occurs, and the cell $C_{12}$ appears white at the electrode to be viewed. Also, at the cell $C_{23}$, twice the electrophoretic migration towards the $Y_3$ electrode and towards $X_2$ electrode occurs in the erase period and in the $X_2$-line period, respectively, and the cell $C_{23}$ appears white.

When the scanning of the whole display panel has been carried out, the information is displayed in white on a blue background. If the polarity of the erase, selecting and information pulses are all reversed by switching of the switches $SW_1$ to $SW_5$, the information will be displayed in blue on a white background.

Figure 9:
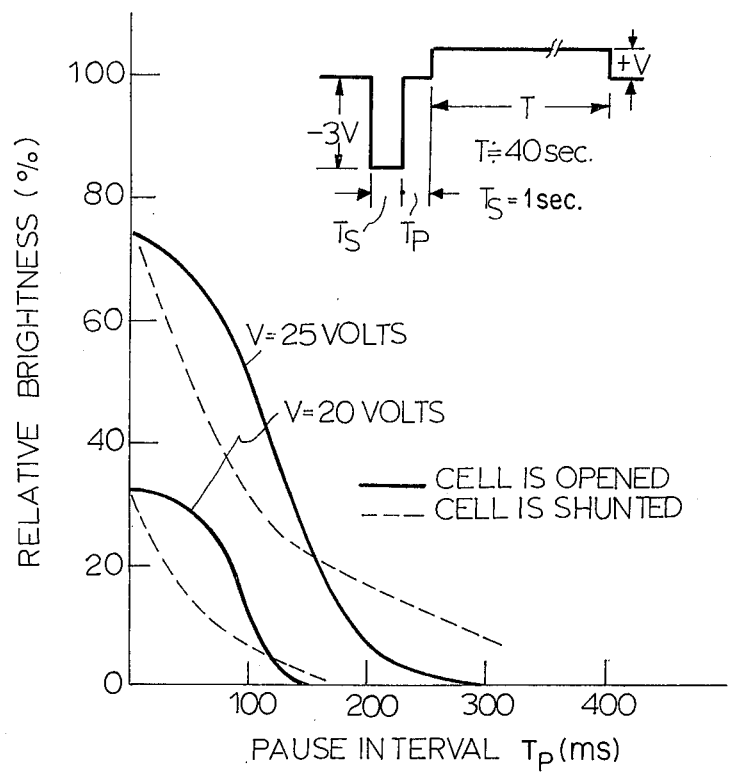
FIG. 9 is a graph of experimental data showing the relation between brightness levels and pause intervals with respect to a typical electrophoretic display cell.

FIG. 9 shows the relative brightness versus the pause interval $T_p$ for another POBNL cell including the same kind of the suspension layer. The relative brightness is the ratio of the saturated brightness caused by the application of V volts D.C. to the brightness caused by the application of the pulse having 3V volts height and 1 second width. The solid curves indicate the relative brightness versus the pause interval $T_p$ during which both electrodes of said cell are opened for two applied D.C. voltages, V=20 volts and 25 volts. The broken curves indicate the relative brightness versus pause interval $T_p$, during which both electrodes of the cell are shunted, for two applied voltages of V=20 volts and 25 volts. It will be understood from FIG. 9 that both the open and shunted pause intervals are effective for reducing or eliminating the cross effect. It is apparent that is is preferable that the pause interval, $T_p$ be longer. In the case of the shunted pause interval, it is preferable, as experiments show, that $T_p$ be longer than about $T_p$ as defined by the equation $\log T_p = 6(\log V - 1)$, in order to reduce the relative brightness below 10%.

Figure 7:
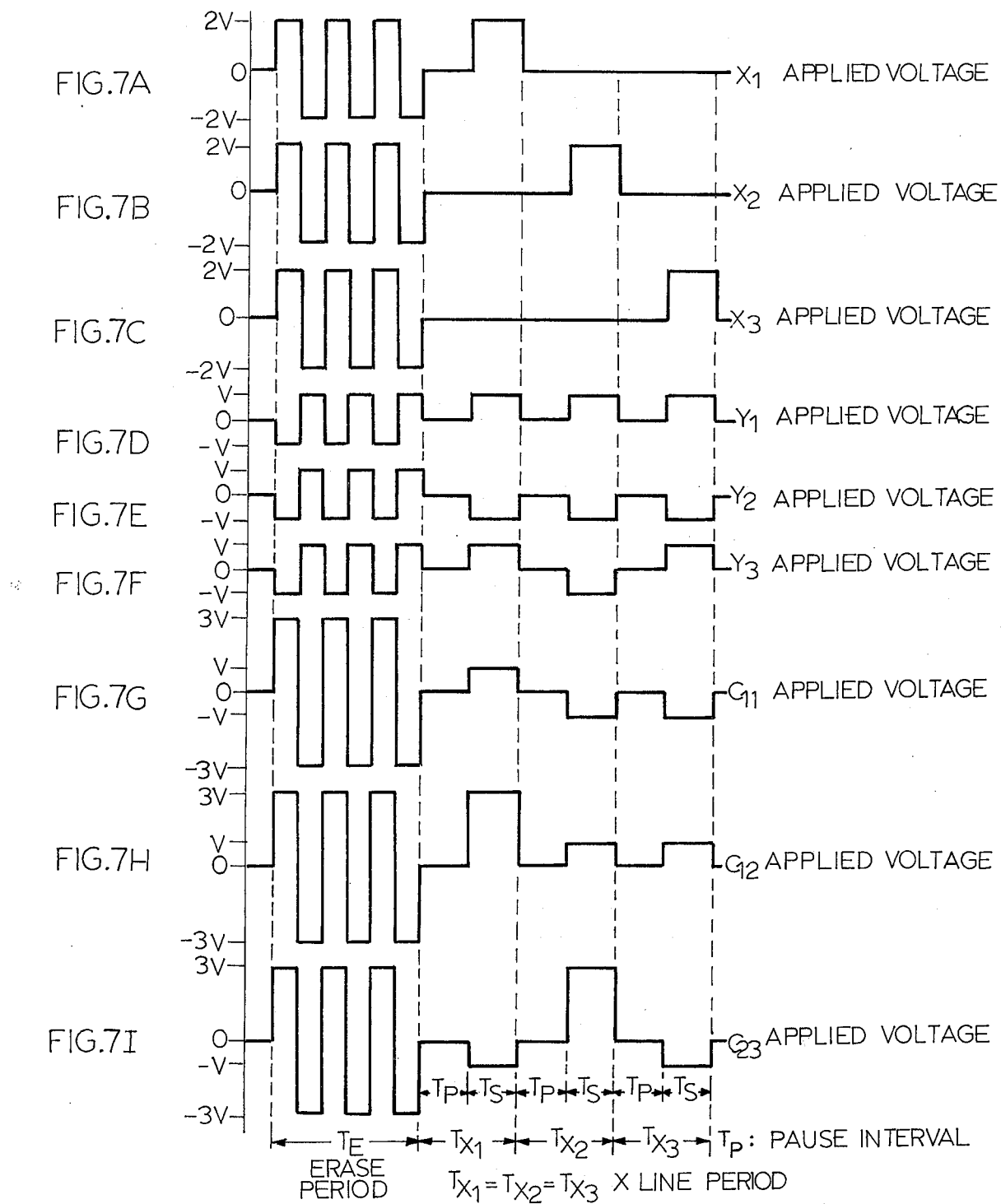
FIGS. 7A–7I are wave forms of the various signals showing the relationship, in time, among the selecting pulses, the data pulses and the voltages applied to the electrophoretic display cells.
Figure 10:
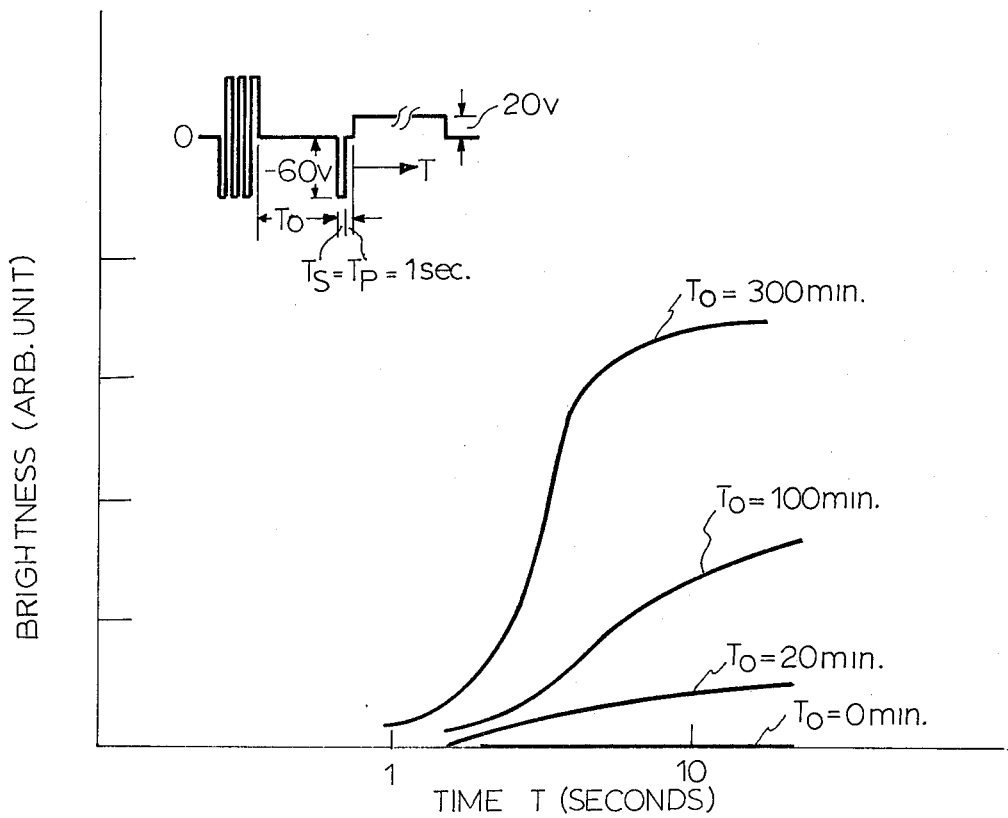
FIG. 10 is a graph of experimental data which shows rise characteristics of the response of a typical electrophoretic display cell.

In addition, the above described threshold characteristics of the POBNL cell due to the pause interval, as shown in FIG. 8, deteriorate gradually over the operating life of the cell. It has been discovered that the threshold characteristics of the cells can be immediately recovered by the application of alternating pulses. FIG. 10 shows the rise characteristics of the POBNL cell, to which a pulse having a 20 volts amplitude and about a 40 sec width is applied after a a sec pause interval, for the several lengths of the operation time after the application of an alternating pulse having a ± 60V amplitude and a 1 Hz frequency. Because the erase operation of the displayed information is accomplished by the alternating X- and Y-erase pulses, as shown in FIG. 7, all the cells of the electrophoretic matrix panel recover their threshold characteristics immediately when the cells are erased.

It is easily understandable that multiple digits of a conventional 7-segment numerical display panel including the electrophoretic suspension layer can be addressed effectively according to this invention. Each of the X- and Y-line electrodes in a matrix panel as shown in FIG. 1 is equivalent to a digit-and segment-electrode in the numerical display panel, respectively.

What is claimed is:

1. A scanning apparatus for an electrophoretic matrix display panel having opposed spaced X-line and Y-line electrodes and having a multiplicity of display cells located between said X-line and Y-line electrodes, said scanning apparatus comprising an X-line electrode driving circuit adapted to be coupled to said X-line electrodes and having a set of X-line drivers for supplying an X-erasing pulse and a selecting pulse with a pause interval to an X-line electrode, said pause interval being supplied before said selecting pulse is supplied and after said X-erasing pulse is supplied so as to stop the supply of any voltage to said X-line electrode during said pause interval; a Y-line electrode driving circuit adapted to be coupled to said Y-line electrodes and having a set of Y-line drivers for supplying a Y-erasing pulse and a data pulse with a pause interval to a Y-line electrode, said Y-erasing pulse, pause interval and data pulse supplied to said Y-line electrode being synchronized with said X-erasing pulse, pause interval and selecting pulse supplied to said X-line electrode, respectively, so as to stop the supply of any voltage to the display cell at the intersection of said X-line electrode and said Y-line electrode during said pause interval, the voltage difference between said selecting pulse and said data pulse being applied as an information pulse to said display cell; and an information signal supply means coupled to said X-line and Y-line electrode driving circuits.

2. A scanning apparatus as claimed in claim 1 wherein the voltage of said information pulse is 3V, and the display cell is supplied with at most a voltage V in the absence of said information pulse.

3. A scanning apparatus as claimed in claim 1 wherein said X-line and Y-line electrode driving circuits comprise means for supplying all of said X-line and Y-line electrodes with alternating X-erasing pulses and with alternating Y-erasing pulses having the opposite polarity to said alternating X-erasing pulses, respectively, at the start of updating of display.

* * * * *